Oct. 14, 1941.          W. S. HILL          2,259,135
STABILIZING SYSTEM
Filed Aug. 10, 1940

Inventor:
William S. Hill,
by Harry E. Dunham
His Attorney.

Patented Oct. 14, 1941

2,259,135

UNITED STATES PATENT OFFICE 2,259,135

STABILIZING SYSTEM

William S. Hill, Westport, Conn., assignor to General Electric Company, a corporation of New York Application August 10, 1940, Serial No. 352,158

5 Claims. (Cl. 290—7)

This invention relates to stabilizing systems and more particularly to improvements in systems for stabilizing synchronous dynamo-electric machines.

It is well known that synchronous dynamo-electric machines sometimes pull out of step or synchronism with the system comprising one or more other synchronous machines to which they are connected when the load is increased. Such loss of synchronism results in complete loss of power and produces abnormally high currents. The condition of operation of synchronous machines at the point where they will lose synchronism if the load is further increased is known as instability or unstable operation. It is also known that the value of load on any particular machine at which instability occurs can be varied by varying the excitation or field current of the synchronous machine and it has recently been found that over the usual load range of such machines the load value which causes instability is substantially directly proportional to the excitation.

In accordance with this invention there is provided an automatic stabilizing system for preventing instability over a wide range of load and excitation values.

An object of the invention is to provide a new and improved stabilizing system for synchronous dynamo-electric machines.

The invention will be better understood from the following description taken in connection with the accompanying drawing and its scope will be pointed out in the appended claims.

Figure 1:
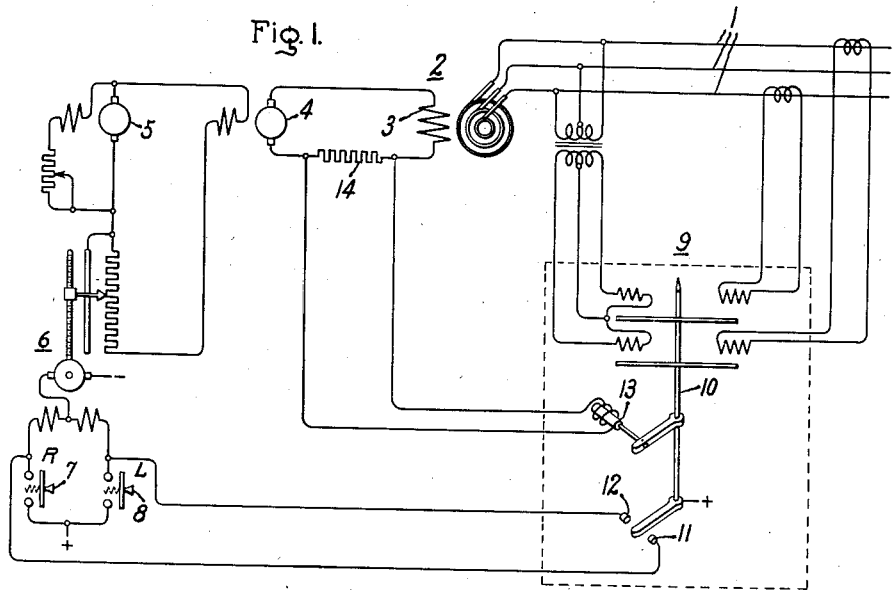
Figure 2:
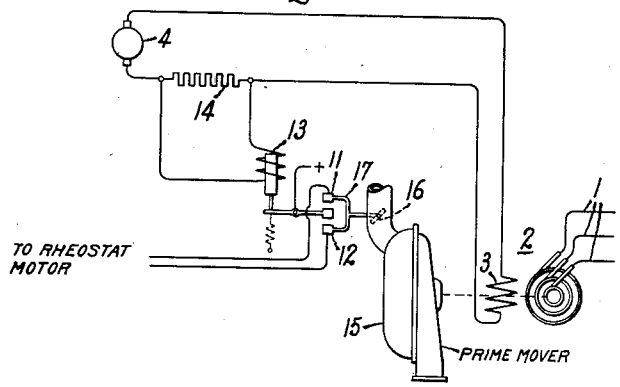
Figure 3:
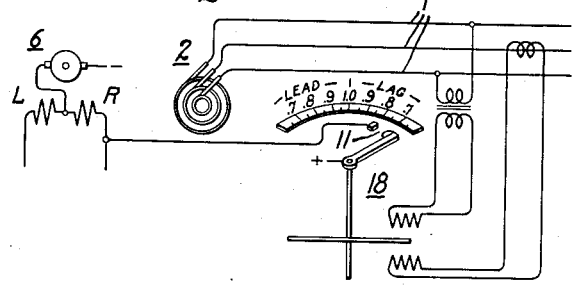

In the drawing, Fig. 1 illustrates diagrammatically an embodiment of the invention in which the automatic stabilizer compares the electrical kilowatt load with the field current, Fig. 2 is a modification in which the position of the inlet valve or throttle of the prime mover which drives an alternator is used as the indication of kilowatt load, and Fig. 3 is a further modification in which power factor is used as an index of instability.

Referring now to the drawing and more particularly to Fig. 1, there is shown therein a three-phase synchronous-to-synchronous power system 1 including an alternator 2. This alternator has an excitation system comprising a direct current field winding 3 energized by a main exciter 4 whose excitation is in turn provided by a pilot exciter 5. This excitation system includes a motor-operator rheostat 6 whose operation in the raising and lowering directions is selectively controlled by means of manual switches 7 and 8.

Rheostat 6 is also controlled automatically by means of a stabilizing relay 9 comprising a wattmeter element 10 connected to the output circuit of the alternator in the usual manner by means of potential and current transformers. This device has a set of contacts 11 and another set of contacts 12 and it is so arranged that the torque of the wattmeter element 10 tends to close the contacts 11 which are connected to the terminals of the rheostat motor which operate it in the direction to raise the excitation of the alternator. Opposing the torque of the wattmeter element is an electromagnet 13 connected to be energized in proportion to the excitation current of the alternator. As shown, it is connected across the terminals of a shunt 14 in the field-exciter circuit.

The torque of the field current responsive element 13 being opposite to that of the wattmeter element, it is in the direction tending to close the contacts 12 which are connected to the other terminal of the rheostat motor, that is to say, to the terminal for causing the rheostat to lower the excitation of the alternator.

The operation of Fig. 1 is such that normally the contacts 11 and 12 are both open so that the position of the rheostat 6 is controlled manually by the switches 7 and 8 in order to regulate the alternator voltage. If, however, the load increases or the field current decreases or both to such an extent that the stability of the alternator is jeopardized, the torque of the wattmeter element 10 will be sufficiently greater than the counter-torque of the field current element 13 to cause closure of the contacts 11, thereby automatically raising the excitation and preventing pullout or loss of synchronism on the part of the alternator. As soon as the excitation has increased sufficiently to restore the ratio of field current to kilowatts to a safe value the contacts 11 will reopen.

On the other hand, if the kilowatt load decreases or the field current increases or both to such an extent that the alternator becomes objectionably over-excited, then the contacts 12 will close, thereby causing the rheostat to decrease the excitation sufficiently to eliminate the objectionable over-excited condition whereupon the contacts 12 will reopen.

In the modification shown in Fig. 2, the alternator is driven by a prime mover 15 of the type which is provided with a throttle or inlet valve 16. Ordinarily, this throttle is operated automatically by a speed governor (not shown) in such a manner that constant speed is maintained under varying load conditions by varying the throttle position so as to supply more or less operating fluid to the prime mover as the case may be. The position of the throttle is therefore an index of the power translated by the prime mover-alternator combination and this is in turn proportional to the kilowatt load on the alternator. Magnetically connected to the throttle is a movable contact carrying the assembly 17 between whose contacts is a movable contact operated by the field current magnet 13. These contacts produce the set of contacts 11 and 12 as in Fig. 1.

The operation of Fig. 2 is essentially the same as that of Fig. 1. Thus, opening of the throttle 16 corresponding to an increase in load will tend to close the contacts 11 unless there is a corresponding increase in field current while a decrease in alternator load corresponding to a closing motion of the throttle will tend to close the contacts 12 unless there is a corresponding decrease in excitation. The contact setting is substantially the same as in Fig. 1 so that a closure of contacts 11 will only occur when the point of instability is closely approached and the closure of contacts 12 will occur when the alternator is objectionably over-excited.

In Fig. 3 the field current biased wattmeter 9 of Fig. 1 and the throttle actuated stabilizing means of Fig. 2 are replaced by a simple contact-making power factor relay 18. This meter is provided with a set of contacts corresponding to the contacts 11 in that they are connected in a circuit for controlling excitation raising operation of the motor-operated rheostat. The setting of these contacts is such that they close when a condition of under-excitation is reached. This under-excited condition of a synchronous generator is usually accompanied by a leading power factor so that the contacts may be set to close whenever the power factor exceeds a predetermined value such as a value just below unity in the lagging direction. For all power factors below unity in the lagging direction the synchronous machine will ordinarily be over-excited and therefore will be stable in operation. As the kilowatt load increases the armature reaction ordinarily tends to decrease the net excitation so that the power factor tends to pass through unity and decrease in a leading direction. However, as soon as the net excitation decreases sufficiently the contacts 11 close, thereby operating the rheostat in a raising direction and effectively preventing under-excitation and instability.

While there have been shown and described particular embodiments of this invention, it will be obvious to those skilled in the art that various changes and modifications can be made therein without departing from the invention, and therefore it is aimed in the appended claims to cover all such changes and modifications as fall within the true spirit and scope of the invention.

What I claim as new and desire to secure by Letters Patent of the United States is:

1. In combination, a synchronous-to-synchronous power system including a prime mover driven alternator, an excitation system for said alternator including a motor-operated rheostat for controlling the excitation of said alternator, means including manually operable raise and lower circuit controllers for controlling the operation of said rheostat, and automatic means responsive to an operating condition of said alternator which is an index of its stability for controlling the operation of said rheostat, said automatic means being substantially independent of alternator voltage.

2. In combination, a synchronous-to-synchronous power system including a prime mover driven alternator, an excitation system for said alternator including a reversible motor-operated rheostat for controlling the excitation of said alternator, manually operable raise and lower switches for selectively controlling the direction of operation of said rheostat, and means which is substantially independent of the voltage of said alternator and which is responsive to an under-excited condition of said alternator for any value of load thereon for automatically operating said rheostat in the direction to raise the alternator excitation to a sufficiently high value to maintain stability at any reasonable value of load.

3. In combination, a synchronous-to-synchronous power system including a prime mover driven alternator, an excitation system for said alternator including a motor-operated rheostat for controlling the excitation of said alternator, means including manually operable raise and lower circuit controllers for controlling the operation of said rheostat, and additional means for controlling the operation of said rheostat automatically, said additional means being operative in accordance with the ratio of the excitation of the alternator to the power translated thereby in such a manner that when said ratio is less than a predetermined value said rheostat will be operated in the direction to raise the alternator excitation.

4. In combination, a synchronous-to-synchronous power system including a prime mover driven alternator, an excitation system for said alternator including a motor-operated rheostat for controlling the excitation of said alternator, a contact-making wattmeter connected to control said rheostat in accordance with the kilowatt load on said alternator, and means responsive to the excitation current of said alternator for opposing the action of said wattmeter.

5. In combination, a synchronous-to-synchronous power system including a prime mover driven alternator, an excitation system for said alternator including a motor-operated rheostat for controlling the excitation of said alternator, an inlet valve for controlling the power output of the prime mover which drives said alternator, an electrical contact mechanically connected to be moved when said valve is moved, a second electrical contact for cooperation with the first-mentioned electrical contact, means responsive to the excitation current of said alternator for moving said second contact relative to the first, and a circuit controlled by said contacts for controlling the operation of said rheostat.

WILLIAM S. HILL.